Dec. 2, 1924.

G. D. NELSON

VEHICLE SIGNAL

Filed Jan. 18, 1924

Inventor
G. D. Nelson
By C. A. Snow & Co.
Attorneys

Dec. 2, 1924.  
G. D. NELSON  
VEHICLE SIGNAL  
Filed Jan. 18, 1924  
1,517,853  
3 Sheets-Sheet 2

Inventor  
G. D. Nelson  
By C. A. Snow & Co.  
Attorneys

Dec. 2, 1924.
G. D. NELSON
VEHICLE SIGNAL
Filed Jan. 18, 1924
1,517,853
3 Sheets-Sheet 3
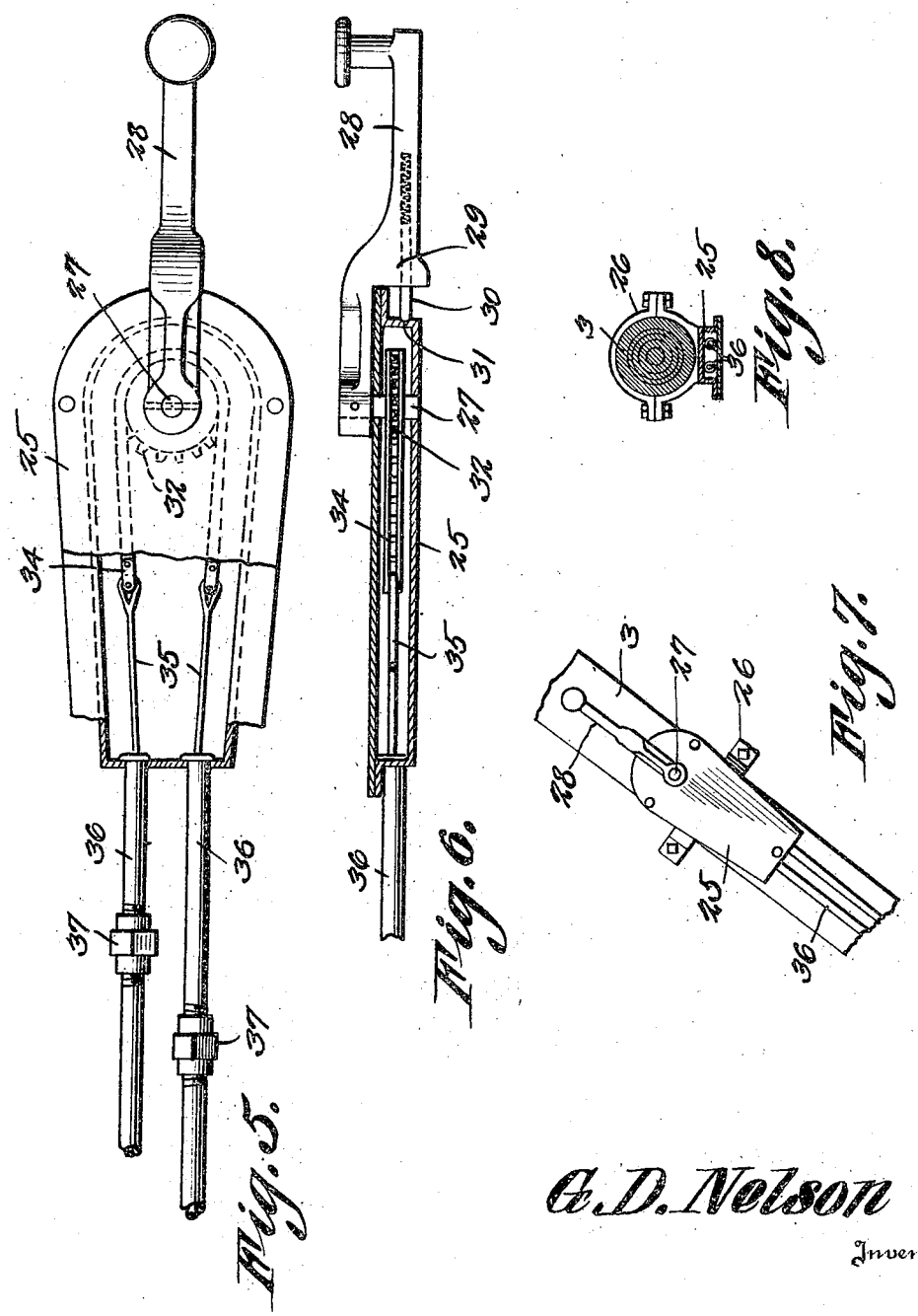

Patented Dec. 2, 1924.

1,517,853

UNITED STATES PATENT OFFICE.

GEORGE D. NELSON, OF TERRE HAUTE, INDIANA.

VEHICLE SIGNAL.

Application filed January 18, 1924. Serial No. 687,066.

*To all whom it may concern:*

Be it known that I, GEORGE D. NELSON, a citizen of the United States, residing at Terre Haute, in the county of Vigo and State of Indiana, have invented a new and useful Vehicle Signal, of which the following is a specification.

The device forming the subject matter of this application is a traffic indicator or signal, adapted to be located on the left front fender of a motor vehicle, or elsewhere, and so constructed that it can be seen readily, either from the front or from the rear, by the drivers of other vehicles, by pedestrians, and by traffic officers. The signal, located as described, will need no extra light to illuminate it, since the ordinary lamp of the vehicle carrying the signal will afford sufficient illumination, the lamps of other vehicles serving, also, to illuminate the signal. The signal is simple in construction and so made that, ordinarily, it will last quite as long as the vehicle on which it is mounted. Another object of the invention is to provide a signal of the sort mentioned which will comply with all necessary traffic rules. A further object of the invention is to provide a device of the kind specified which may be stamped cheaply out of steel, an aluminum indicator or arrow being provided, the construction of the arrow being such that it can be seen readily. The invention aims to provide novel means for mounting the indicator for swinging movement and to supply novel means for imparting swinging movement to the indicator from a remote point.

It is within the province of the disclosure to improve generally and to enhance the utility of devices of that sort to which the invention appertains.

Although a preferred form of the invention has been shown, it will be understood that within the scope of what is claimed, changes may be made by a mechanic, without in anywise departing from the spirit of the invention.

In the accompanying drawings:—

Figure 5 is a plan of the mechanism whereby the indicator is operated from a remote point, parts being in section;

Figure 6 is a longitudinal section of the structure shown in Figure 5;

Figure 7 is an elevation disclosing the operating mechanism as mounted on the steering wheel column;

Figure 8 is a cross section of the structure depicted in Figure 7.

The numeral 1 marks a motor vehicle, the left hand front fender being designated by the numeral 2, and the steering wheel column being shown at 3.

Figure 1:
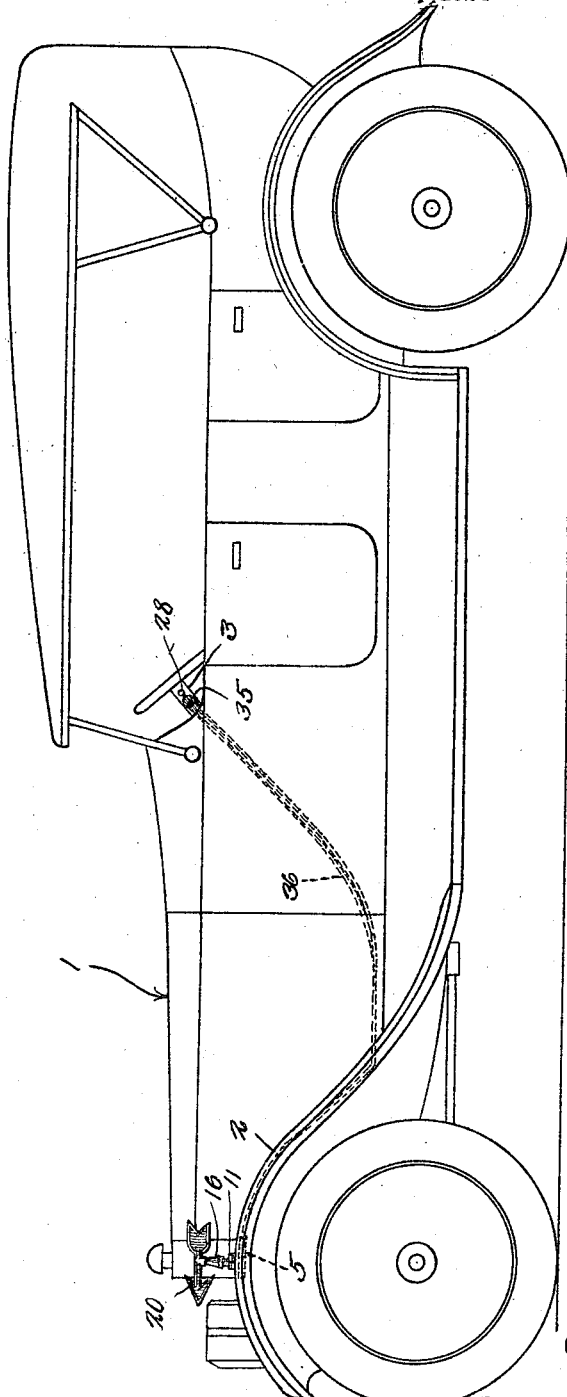
Figure 1 shows, in side elevation, a motor propelled vehicle whereon the device forming the subject matter of this application has been mounted.
Figure 2:
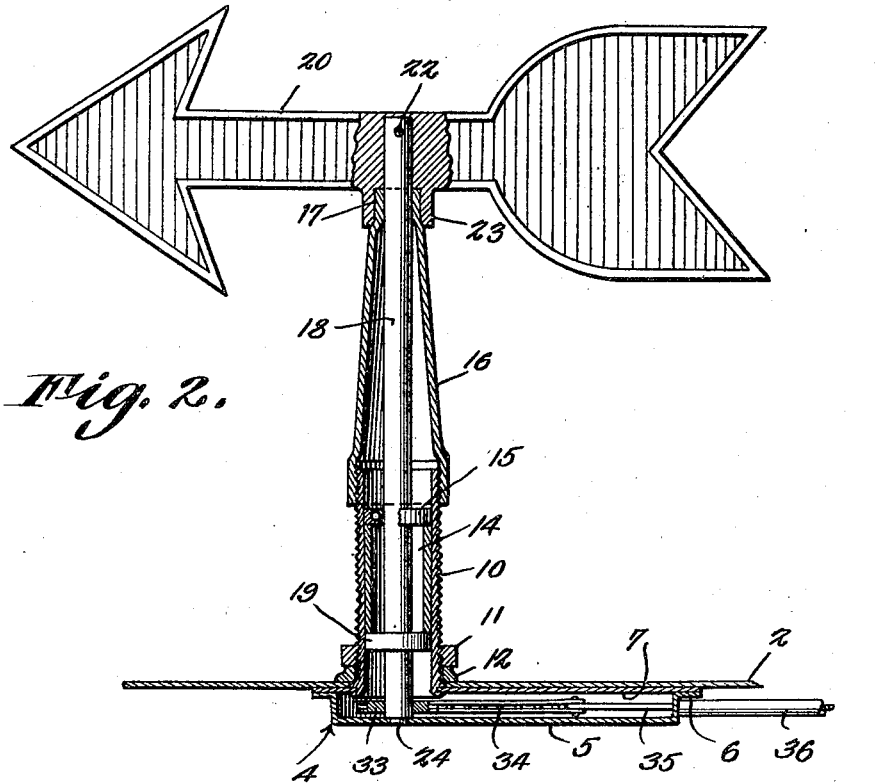
Figure 2 is a vertical sectional view of the mechanism for mounting the indicator, parts being in elevation.
Figure 3:
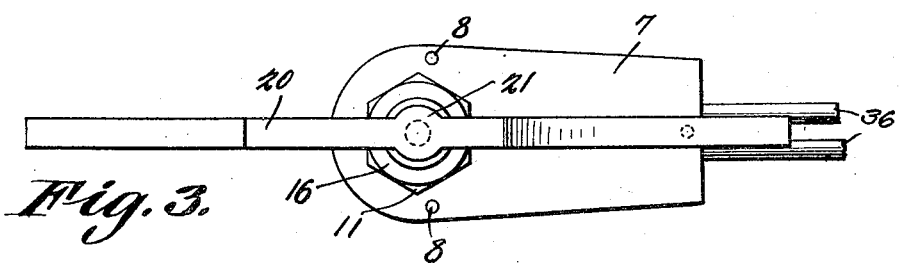
Figure 3 is a top plan of the structure delineated in Figure 2, the fender being omitted.
Figure 4:
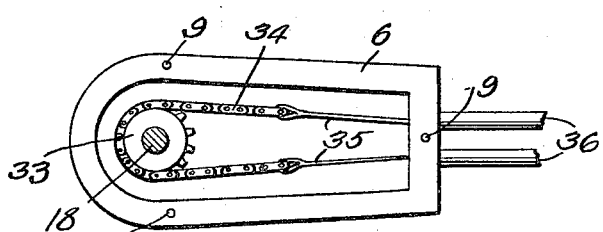
Figure 4 is a plan of the casing, the lid being removed.

In carrying out the invention, there is provided a casing 4, comprising a box-like body 5 having an outstanding flange 6 whereon is mounted a lid 7 held in place by securing elements 8 mounted in openings 9 in the flange 6 of the body 5 and in corresponding openings in the lid 7. The lid 7 carries a tubular standard 10, which is externally threaded, the standard projecting upwardly through the fender 2. A clamping nut 11 is threaded on the standard 10, a washer 12 being interposed between the nut and the fender 2, and, thus, the casing 4 is held in position beneath the fender 2, as clearly shown in Figure 2 of the drawing.

A tubular bushing 14 is pressed into the standard 10 and is held securely therein, the bushing supporting a ball bearing 15 located within the standard. A tapered extension 16 is threaded on the upper end of the standard 10 and is reduced at its upper end to form a bearing 17. In the bearings 17 and 15, a shaft 18 is journaled, the shaft having a bearing collar 19, journaled in the standard 10 in engagement with the lower end of the bushing 14. The numeral 20 designates an indicator, preferably in the form of an arrow, and made of aluminum, the indicator having a central hub 21 wherein the upper end of the shaft 18 is received, the shaft being attached to the hub by a securing element 22. The lower portion of the hub 21 constitutes a collar 23, surrounding the bearing 17 at the upper end of the extension 16, and preventing water from finding its way into the extension 16, the standard 10 and the casing 4. The shaft 18 has a reduced lower end 24, journaled in the bottom of the body 5 of the casing 4.

The numeral 25 designates, generally, a casing constructed like the casing 4, and owing to the similarity of the casings, a detailed description of the casing 25 is not necessary. The casing 25 is secured by means of a clamp 26, detachably, on the steering column 3. A shaft 27 is journaled in the casing 25 and is provided with a handle 28 which is offset, as at 29, to bring the working end of the handle into the same plane with the casing 25. A spring-operated latch rod 30 is mounted slidably in the handle 28 and is adapted to cooperate with seats 31 formed in one end of the casing 25.

A sprocket wheel 32 is secured to the shaft 27 within the casing 25. A sprocket wheel 33 is secured to the shaft 18 within the casing 4. Chains 34 are engaged about the sprocket wheels 32 and 33 and are located in the casings 4 and 25. The chains are connected by flexible elements 35 slidable in guide tubes 36 extended between the casings 4 and 25, connections 37 being interposed in the guide tubes, so that they may be assembled readily.

In practical operation, rotation is imparted to the shaft 27 by the handle 28. The sprocket wheels 32 and 33, together with the chains 34 and the flexible elements 35 rotate the shaft 18, and, thus, the indicator 20 is caused to point straight ahead, to the right or to the left, the latch 30 engaging automatically in the seats 31 to hold the indicator 20 securely but releasably in any position to which it may have been swung.

Having thus described the invention, what I claim is:—

1. In a device of the class described, a casing comprising a body and a lid adapted to be located beneath a vehicle fender, means for securing the lid to the body, a tubular standard carried by the lid and adapted to extend upwardly through a vehicle fender, a nut threaded on the standard and adapted to cooperate with a fender to hold the casing in place beneath the fender, a bushing secured in the standard, a bearing in the standard and cooperating with the upper end of the bushing, a shaft journaled in the bearing and in the bottom of the body of the casing, a bearing about the shaft and located in the standard and cooperating with the lower end of the bushing, an extension detachably mounted on the standard and provided at its upper end with a bearing wherein the shaft is journaled, an indicator on the shaft and receiving the last-specified bearing, and means extended into the casing and accessible from a remote point, for operating the shaft.

2. The combination with the fender and the steering wheel column of a vehicle, of a casing located below the fender, a tubular standard carried by the casing and extended upwardly through the fender, means on the standard and cooperating with the fender to hold the casing on the fender, a shaft journaled in the standard, a second casing, means for securing the second casing to the column, a shaft journaled in the second casing, means for operating the last-specified shaft, sprocket wheels on the shafts and located in the casings, chains engaged with the sprocket wheels, tubular guides extended between the casings, and flexible elements slidable in the guides, and connected to the chains.

In testimony that I claim the foregoing as my own, I have hereto affixed my signature in the presence of two witnesses.

GEORGE D. NELSON.

Witnesses:
QUINCY L. RUSSELL,
J. W. SMITH.